Mar. 13, 1923.

J. C. SMITH.
SAW SET.
FILED MAR. 15, 1921.

WITNESSES
Ray Epstein
W. Rosenfield

INVENTOR
John Clemons Smith

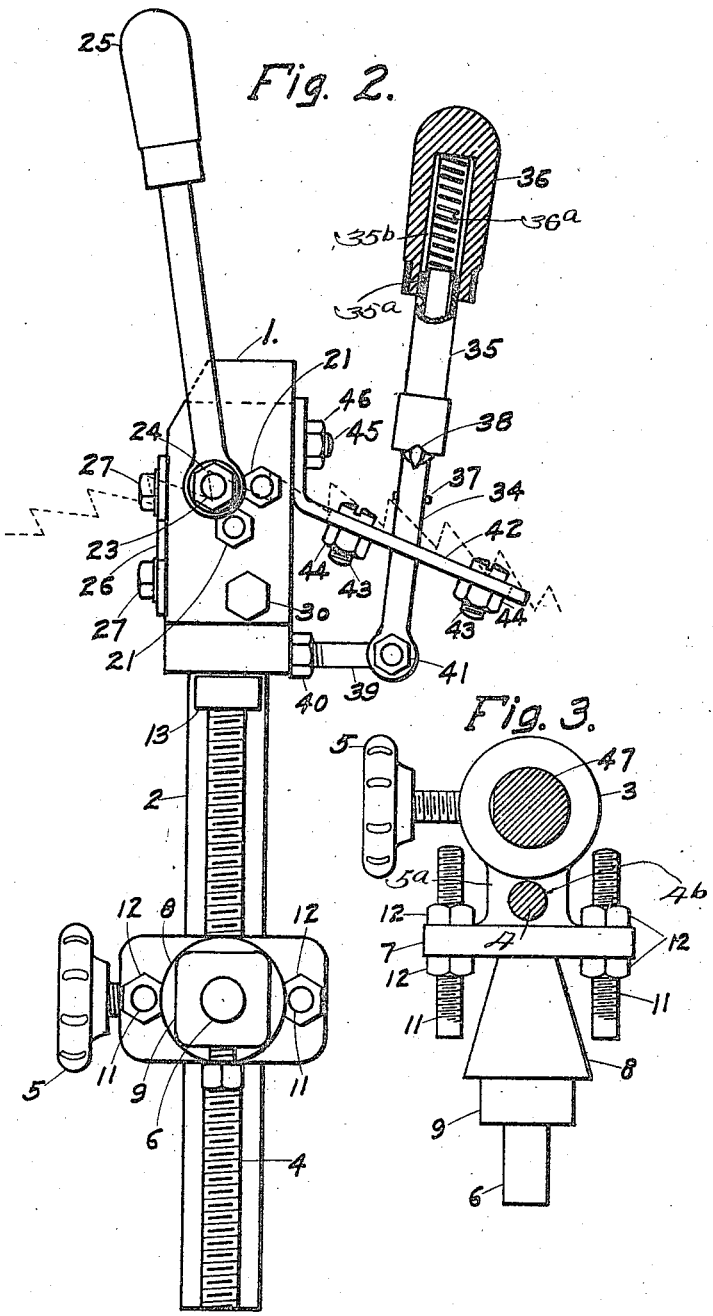

Patented Mar. 13, 1923.

1,448,602

UNITED STATES PATENT OFFICE.

JOHN CLEMONS SMITH, OF MEMPHIS, TENNESSEE.

SAW SET.

Application filed March 15, 1921. Serial No. 452,532.

*To all whom it may concern:*

Be it known that I, JOHN CLEMONS SMITH, a citizen of the United States, residing at Memphis, in the county of Shelby and State of Tennessee, have invented certain new and useful Improvements in Saw Sets, of which the following is the specification.

This invention relates to a saw set, designed primarily for use in connection with the setting of the teeth of circular saws, but it is to be understood that the device can be employed for any purpose wherein it is found applicable, and the invention has for its object to provide a saw set, in a manner as hereinafter set forth, with means to provide for the adaptability thereof for setting the teeth of saws of different diameters.

A further object of the invention is to provide a device, in a manner as hereinafter set forth, with means to prevent the body of the saw from being sprung during the setting operation.

A further object of the invention is to provide a saw set, in a manner as hereinafter set forth, with an adjustable feed device to provide for the adaptability thereof for use in connection with different arrangements of saw teeth, so as to obtain proper feed of the teeth of the saw during the setting operation.

Further objects of the invention are to provide a saw set which is simple in its construction and arrangement, adjustable, strong, durable, compact, readily set up and comparatively inexpensive.

With the foregoing and other objects in view, the invention consists of the novel construction, combination and arrangement of parts, as hereinafter more specifically described and illustrated in the accompanying drawings, wherein is shown an embodiment of the invention, but it is to be understood that changes, variations and modifications can be resorted to which come within the scope of the claims hereunto appended.

In the drawings wherein like reference characters denote corresponding parts throughout the several views:—

Figure 2 is a side elevation,

Figure 3 is a plan, partly in section, illustrating the saw support,

Figure 4:
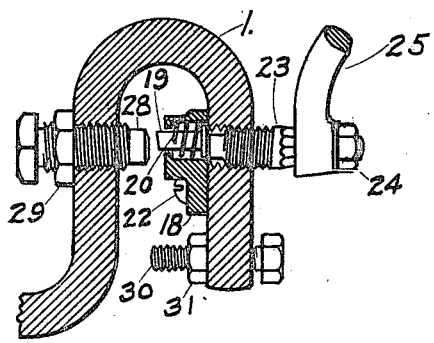
Figure 4 is a fragmentary sectional view illustrating the setting tool and the anvil.
Figure 1:
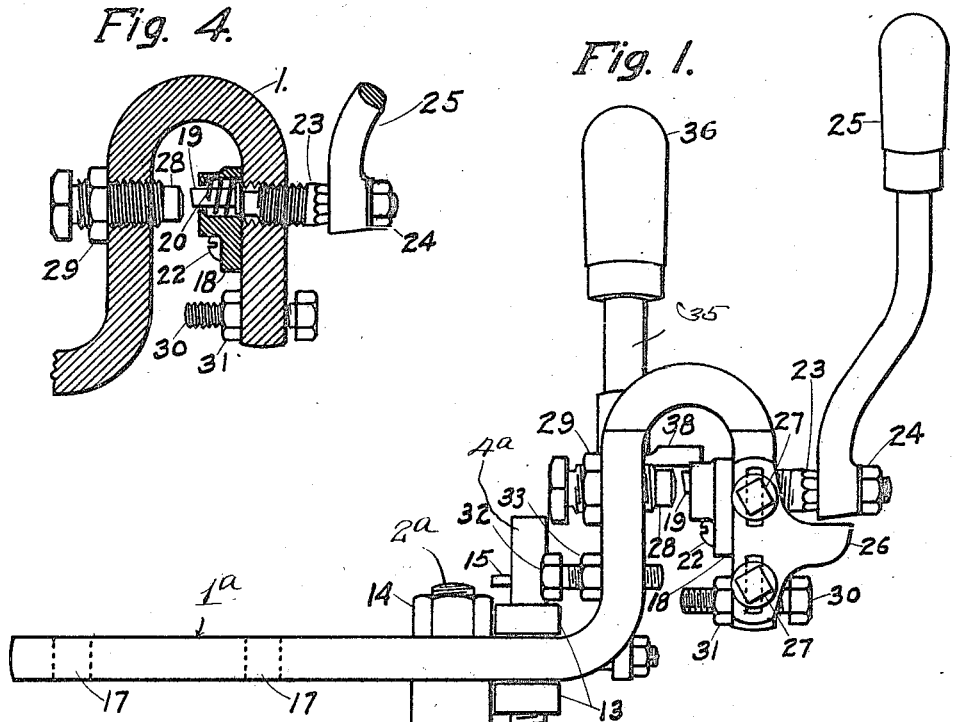
Figure 1 is a front elevation of a saw set, in accordance with this invention.
Figure 5:
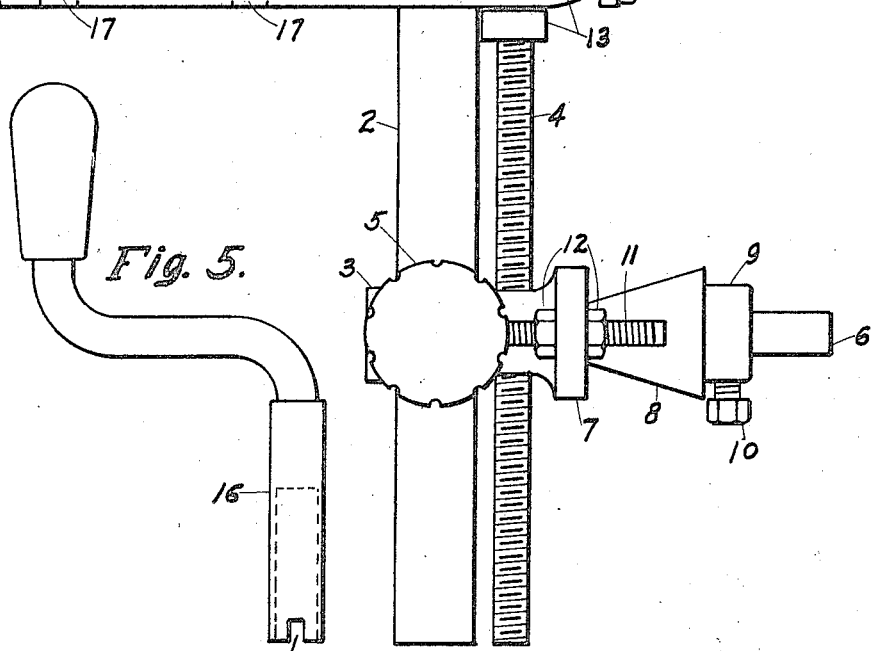
Figure 5 is a detail illustrating the handle for operating the shifting element for the saw support.

Referring to the drawings in detail, a saw set in accordance with this invention comprises an inverted U-shaped head 1, having projecting from the lower terminus of one of the legs or arms thereof a laterally disposed support $1^a$, provided with openings 17, through which are adapted to extend hold-fast devices, not shown, for fixedly securing the head 1, to a suitable support.

Depending from the extension $1^a$ is a vertically disposed guide bar 2, formed at its upper end with a reduced extension $2^a$, which is peripherally threaded. The bar 2, is secured to the extension $1^a$, by a nut 14, having threaded engagement with the reduced threaded end $2^a$, of the bar 2.

A vertically adjustable supporting element is provided for the saw, for holding the latter during the setting operation and the said element consists of a cylindrical sleeve 3, slidably and adjustably mounted on the guide bar 2, and which is maintained in its adjusted position, by a clamping screw 5, the latter being carried by the sleeve 3, and capable of engaging with the bar 2, for maintaining the sleeve 3, in its adjusted position. Projecting laterally from the sleeve 3, as well as being formed integral therewith, is an arm $5^a$, provided with a vertically disposed opening having the wall thereof threaded. The arm $5^a$, terminates in a rectangular plate 7, which has projecting outwardly therefrom a cylindrical extension 6, carrying a cone-shaped member on which a saw is rotatably supported, and which is fixedly secured against the plate 7, by a collar 9, mounted on the extension 6, and detachably secured in position by a lock screw 10. Adjustably mounted at each end of the plate 7, is a threaded holding member, and each of said members 11, is secured in its adjusted position by the nuts 12, these latter abut against the forward and rear face of the plate 7. The holding members 11, are arranged at each side of the support 8. The saw to be operated on, is mounted on the cone-shaped support 8, and the members 11, are adjusted to set up a retaining action with respect to the saw, when the latter is mounted on a support 8, thereby preventing the lateral shifting of the saw during the setting operation. The support 8, extends through the central opening in the saw and as said support 8, is conoidal in contour, provision is made for the mounting thereof in openings of different sizes, at the center of the saws, and furthermore the shape of said support 8, with respect to the holding members 11, provides for a wedge action to take place so that the saw is securely held in position. The opening formed in the arm 5ª, is indicated at 4ᵇ, and extending therethrough, as well as having threaded engagement with the walls of said opening, is a rotatable threaded adjusting shaft 4, which is connected to the extension 1ª, by the collars 13. The shaft 4, is extended above the upper collar 13, as at 4ª, and the said extended portion 4ª, is formed with a lateral lug 15. Adapted to be mounted on the extended portion 4ª, of the shaft 4, is a crank 16, having a notched lower end 16ª, for the purpose of straddling the lug 15. The crank 16, is employed for rotating the shaft 4, to vertically adjust the saw supporting element.

Secured to the inner face of one of the arms or legs of the head 1, that is the outer arm or leg, by the hold-fast devices 22, is a casing or housing 18, for the setting tool 19. Arranged within the housing 18, and inclosing the tool 19, is a coiled spring 20, employed for returning the tool 19, to normal position. The tool 19, permanently projects from the housing 18. That leg or arm of the head 1, to which the housing 18, is secured, is formed with an opening having the wall thereof threaded, and threadably engaging with the wall of said opening, is an operating means for the tool 19, and which consists of a threaded arm formed with a reduced inner end engageable with the tool 19, for forcing the latter inwardly to set a tooth, when the arm 23, is revolved. Secured to the outer end of the arm 23, and maintained thereon through the medium of a nut 24, is an operating lever 25, for the arm 23. For limiting the movement of the lever 25, that arm or leg of the head with which the arm 23, engages, has adjustably secured thereto, by the detachable hold-fast devices 27, a slotted stop member 26, the latter being arranged in the path of the arm 25.

Secured to that leg or arm of the head 1, opposite that leg or arm carrying the housing 18, is an anvil 28, positioned to cooperate with the tool 19, formed on the inner end of a short bar having threaded engagement with the arm or leg of the head, and secured in position by a nut 29. The feed mechanism or device for the saw, comprises a curved bolt 39, secured to that arm or leg of the head 1, which carries the anvil 28, and the said curved bolt 39 is maintained in position by a nut 40, and carries on its outer end a feed lever, mounted for rocking movement on said outer end of the bolt 39, and maintained in position by a nut 41. The feed lever is formed of two sections 34, 35, the latter telescoping on the former and is provided at its lower end with a laterally disposed finger 38, adapted to be positioned in the gullets of the saw and engage the vertical edge of the teeth for intermittently rotating the saw to position a tooth to be acted on by the tool 19. A pin 37, is provided in the section 34, to limit the downward movement of the section 35 of the feed lever. The section 35, of the feed lever is provided at its upper end with a handle 36, and interposed between the upper end of the section 34, and the top of the handle 36, is a coiled spring 36ª for normally maintaining the section 35, extended above the section 34. A pin 35ª is provided on the upper end of the section 34, and extends in slots 35ᵇ, formed in the upper portion of the section 35, to prevent the latter rotating with respect to the section 34.

The feeding movement of the feeding lever is controlled so as to provide for different spaced or sizes of saw teeth, by a pair of adjustable stop elements 43, which are threaded and carry securing nuts 44. The stop elements 43, are mounted in a slotted bracket 42, through which extends the section 34, of the feed lever. The bracket 42 is angle shaped and is secured to that arm or leg of the head 1, which is provided with the housing 18, by a bolt 45, provided with a nut 46.

To prevent the body of the saw from being sprung, when pressure is applied to the teeth thereof, during the setting operation, each of the arms or legs of the head 1, is provided with an adjustable abutment member and each of these abutment members is in the form of a threaded bolt having threaded engagement with an arm or leg of the head 1. The abutment members extend in opposite directions with respect to each other and one is arranged above the other. The abutment member carried by that arm or leg of the head 1, which carries the tool 19, is indicated at 30, and is provided with a nut 31, to maintain it in its adjusted position. The abutment member carried by the other arm or leg of the head 1, is indicated at 32, and is provided with a nut 33, for the purpose of maintaining it in its adjusted position. The nut 31, is arranged within the head 1, while the nut 33, is arranged exteriorly of the head 1. The abutment member 30, is arranged below the abutment 32. The abutment member 32, not only assists in preventing the springing of the body portion of the saw but furthermore prevents the teeth of the saw from catching on the anvil 28.

The manner of setting up the anvil 28, provides for the adjustment thereof when occasion so requires and which is held in its adjusted position by the nut 25.

The crank 16, is removable with respect to the shaft 4, thereby preventing any interference thereof with the operator during the setting operation, more particularly during the operation of the feeding mechanism as after the adjustable saw support has been shifted to and secured in the desired position, the crank 16, can be removed, as it will not be required unless it is desired to adjust the saw support again.

From the foregoing description taken in connection with the accompanying drawings, an adjustable saw set is provided, capable of operating on saws of different diameters and furthermore, one having the parts thereof so arranged that they can be conveniently adjusted to provide for different sizes of saws and furthermore including a feeding mechanism which can be controlled so as to set up a feeding operation irrespective of the different sizes or widths of teeth and it is to be understood that although the drawings illustrate the preferred embodiment of the invention, yet it is to be understood that changes in the detail of construction can be had without departing from the spirit of the invention.

What I claim is:—

1. A saw set comprising a supporting head, a vertically adjustable saw supporting element arranged below said head and provided with means for rotatably supporting a saw extending within said head, a spring controlled reciprocatory setting tool supported on the inner face of the head, an anvil having threaded engagement with the head and opposing said tool, a lever actuated rotatable tool operating means carried by the head, said setting tool being spring controlled, and said means having threaded engagement with said head.

2. A saw set comprising a supporting head, a vertically adjustable saw supporting element arranged below said head and provided with means for rotatably supporting a saw extending within said head, spring controlled reciprocatory setting tool supported on the inner face of the head, an anvil having threaded engagement with the head and opposing said tool, a lever actuated rotatable tool operating means carried by the head and having threaded engagement with said head, and an oscillatory saw feed mechanism supported from and exteriorly of the head.

3. A saw set comprising a supporting head, a vertically adjustable saw supporting element arranged below the head and provided with means for rotatably supporting a saw extended within the head, a reciprocatory spring controlled setting tool supported from the inner face of the head, an adjustable anvil threadably engaging with the head and associated with the tool, a lever actuated rotatable tool operating means having threaded engagement with the head, and an adjustable oscillatory saw feed mechanism connected to the head exteriorly thereof.

4. A saw set comprising an inverted U-shaped supporting head, a vertically adjustable saw supporting element arranged below said head and provided with a conoidal shaped member for rotatably supporting a saw extended within the head and further including adjustable abutment members at each side of the conoidal shaped member, a setting tool carried by the head at the inner face of one side thereof, an anvil carried by the head at the inner face of the other side thereof, and a lever actuated rotatable tool operating means carried by and having threaded engagement with the head.

5. A saw set comprising an inverted U-shaped supporting head, a vertically adjustable saw supporting element arranged below said head and provided with a conoidal shaped member for rotatably supporting a saw extended within the head and further including adjustable abutment members at each side of the conoidal shaped member, a setting tool carried by the head at the inner face of one side thereof, an anvil carried by the head at the inner face of the other side thereof, a lever actuated rotatable tool operating means carried by and having threaded engagement with the head, and an oscillatory saw feed mechanism connected to the head exteriorly thereof.

6. A saw set comprising an inverted U-shaped supporting head, a vertically adjustable saw supporting element arranged below said head and provided with a conoidal shaped member for rotatably supporting a saw extended within the head and further including adjustable abutment members at each side of the conoidal shaped member, a setting tool carried by the head at the inner face of one side thereof, an anvil carried by the head at the inner face of the other side thereof, a lever actuated rotatable tool operating means carried by and having threaded engagement with the head, and an oscillatory saw feed mechanism connected to the head, and means to provide for the adjustment of said mechanism.

7. A saw set comprising an inverted U-shaped supporting head, a vertically adjustable saw supporting element arranged below said head and provided with a conoidal shaped member for rotatably supporting a saw extended within the head and further including adjustable abutment members at each side of the conoidal shaped member, a setting tool carried by the head at the inner face of one side thereof, an anvil carried by the head at the inner face of the other side thereof, a lever actuated rotatable tool operating means carried by and having threaded engagement with the head, an oscillatory saw feed mechanism connected to the head, means to provide for the adjustment of said mechanism, and an abutment member carried by each side of the head below said anvil and tool.

8. A saw set comprising an inverted U-shaped supporting head provided at one side with an extension adapted to be anchored to a support, a vertically adjustable saw supporting element suspended from said extension and provided with means for rotatably supporting a saw extended into the head, a reciprocatory spring controlled saw setting tool supported at the inner face of one side of the head, an anvil carried by and threadably engaging with the other side of the head, and a lever actuated rotatable tool operating means having threaded engagement with the head.

9. A saw set comprising an inverted U-shaped supporting head provided at one side with an extension adapted to be anchored to a support, a vertically adjustable saw supporting element suspended from said extension and provided with means for rotatably supporting a saw extended into the head, a spring controlled saw setting tool supported at one side of the head, an anvil carried by and threadably engaging with the other side of the head, a lever actuated rotatable tool operating means having threaded engagement with the head, and an oscillatory saw feed lever connected to that side of the head provided with the anvil and having its lower portion provided with means to abut against the saw for feeding it.

10. A saw set comprising an inverted U-shaped supporting head provided at one side with an extension adapted to be anchored to a support, a vertically adjustable saw supporting element suspended from said extension and provided with means for rotatably supporting a saw extended into the head, a spring controlled saw setting tool supported at one side of the head, an anvil carried by the other side of the head, a lever actuated rotatable tool operating means having threaded engagement with the head, an oscillatory saw feed lever connected to that side of the head provided with the anvil and having its lower portion provided with means to abut against the saw for feeding it, and means arranged intermediate the ends of said lever to provide for the adjusting thereof.

11. A saw set comprising an inverted U-shaped supporting head provided at one side with an extension adapted to be anchored to a support, a vertically adjustable saw supporting element suspended from said extension and provided with means for rotatably supporting a saw extended into the head, a spring controlled saw setting tool supported at one side of the head, an anvil carried by the other side of the head, a lever actuated rotatable tool operating means having threaded engagement with the head, an oscillatory saw feed lever connected to that side of the head provided with the anvil and having its lower portion provided with means to abut against the saw for feeding it, means arranged intermediate the ends of said lever to provide for the adjusting thereof, and said supporting element further provided with adjustable abutments.

12. A saw set comprising an inverted U-shaped supporting head provided at one side with an extension adapted to be anchored to a support, a vertically adjustable saw supporting element suspended from said extension and provided with means for rotatably supporting a saw extended into the head, a spring controlled saw setting tool supported at one side of the head, an anvil carried by the other side of the head, a lever actuated rotatable tool operating means having threaded engagement with the head, an oscillatory saw feed mechanism connected to that side of the head provided with the anvil having its lower end provided with means to abut against the saw for feeding it, means to provide for the adjusting of said mechanism, said supporting element further provided with adjustable abutments, and oppositely disposed adjustable abutments carried by the head below said anvil and tool.

13. A saw set comprising a supporting head provided with a setting tool and an anvil, said tool and anvil oppositely disposed with respect to each other, actuating means for said tool, said means separate from said tool and threadably engaging with said head, a vertically adjustable arm arranged below said head and provided with a cylindrical extension, a conoidal shaped member slidably mounted on said extension and providing means for rotatably supporting a saw extended within said head, means for securing said member in position, adjustable abutments supported from said arm and having said member extend therebetween, and means connected with the head for feeding the saw.

14. A saw set comprising an inverted U-shaped supporting head, a setting tool supported from the inner face of one of the legs of said head, an adjustable anvil threadably engaging with the other leg of said head and opposing said tool, actuating means for said tool, said means separate from said tool and threadably engaging with that leg of the head from which the tool is supported, a vertically adjustable arm arranged below said head and provided with a cylindrical extension, a supporting member slidably mounted on said extension and constituting means for rotatably supporting a saw extended within said head, means for securing said member in position on said extension, adjustable abutments carried by said arm and each arranged at one side of said member, and means supported from that leg of the head carrying the anvil for feeding the saw.

In testimony whereof, I affix my signature in the presence of two witnesses.

JOHN CLEMONS SMITH.

Witnesses:
 RAY EPSTEIN,
 W. B. ROSENFIELD.